United States Patent [19]

Li et al.

[11] Patent Number: 4,536,815
[45] Date of Patent: Aug. 20, 1985

[54] PROTECTIVE RELAY APPARATUS AND METHOD FOR PROVIDING SINGLE-POLE TRIPPING

[75] Inventors: Hung J. Li; Leonid Husak, both of Coral Springs, Fla.

[73] Assignee: Westinghouse Electric Corp., Pittsburgh, Pa.

[21] Appl. No.: 527,602

[22] Filed: Aug. 29, 1983

[51] Int. Cl.³ .............................................. H02H 3/16
[52] U.S. Cl. ....................................... 361/47; 361/86
[58] Field of Search ................... 361/107, 76, 86, 79, 361/42, 47

[56] References Cited

U.S. PATENT DOCUMENTS 3,154,737 10/1964 Hodges .................................. 361/76
4,398,232 8/1983 Elmore ................................... 361/79

Primary Examiner—A. D. Pellinen
Assistant Examiner—Hong K. Choe
Attorney, Agent, or Firm—William E. Zitelli

[57] ABSTRACT

An apparatus and method for detecting a single-phase-to-ground fault on a three-phase electrical power system and for identifying the faulted phase conductor. Each phase conductor is monitored by evaluating three phasor signals associated therewith, i.e., the zero sequence current of the electrical power system, the negative sequence voltage on the phase conductor rotated 90 electrical degrees counterclockwise (or the negative sequence current on the phase conductor), and the quadrature phase voltage for the phase conductor rotated 30 electrical degrees counterclockwise. The coincidence of these three signals for a predetermined time indicates the occurrence of a single-phase-to-ground fault on the monitored phase conductor.

11 Claims, 7 Drawing Figures

PROTECTIVE RELAY APPARATUS AND METHOD FOR PROVIDING SINGLE-POLE TRIPPING

BACKGROUND OF THE INVENTION

1. Field of the Invention

This invention relates generally to protective relay apparatus and methods for providing single-pole tripping for ac electrical power transmission lines, and more specifically, to improved protective relay apparatus and methods for providing single-pole tripping for single-phase-to-ground faults for any value of fault resistance.

2. Description of the Prior Art

Three-phase ac electrical power transmission lines and power generating equipment must be protected against insulation faults and consequent short circuits or drops in shunt resistance that could cause collapse of the power system and serious and expensive apparatus damage. For instance, such a fault condition is caused by lightning-induced flashover from a transmission line to ground or between adjacent transmission line conductors. Under such a faulted condition, line currents can increase to several times the normal value, thereby causing loss of synchronism among generators and damaging or destroying both the transmission line and the attached equipment. To avoid equipment damage and collapse of the entire power system, faulted apparatus must be isolated from the network as fast as possible. Protective relays, which continuously monitor ac voltages and/or currents, locate line faults and initiate isolation via tripping of the appropriate circuit breakers.

Most faults on three-phase ac electrical power transmission lines are transient single-phase-to-ground faults. Conventionally, such a fault is cleared by three-pole tripping. Alternatively, the fault can be cleared by clearing only the faulted phase conductor (i.e., single-pole tripping) followed by high speed reclosing. Use of single-pole tripping enables synchronizing power to be exchanged between the other two non-faulted phase conductors and minimizes system shock, ensuring a greater degree of stability. A large generation plant, for example, connected to the electrical power system via a single transmission line, retains synchronization when single-pole tripping is used. Three-pole tripping requires the power generating machines to be resynchronized before reconnection to the system.

In single-pole tripping, the protective relay must distinguish a single-phase-to-ground fault from a phase-to-phase fault, a double-phase-to-ground fault, and three-phase faults, and must correctly identify the faulted phase conductor. Several techniques are available for providing single-pole tripping, including: evaluation of the zero or negative sequence currents in a pilot relaying scheme; traveling-wave evaluation (see U.S. patent application Ser. No. 404,170, filed Aug. 2, 1982, now U.S. Pat. No. 4,438,475, and assigned to the assignee of the present invention), and segregated phase comparison.

Additionally, U.S. patent application Ser. No. 321,158 (filed Nov. 13, 1981), now U.S. Pat. No. 4,398,232, discloses a novel apparatus and method for detecting a single-phase-to-ground fault on a three-phase electrical power system, and for identifying the faulted phase conductor. In this prior art technique, each phase conductor is monitored using phasor signals representative of: (1) the sum of the three phase currents, (2) the negative sequence current or voltage of the monitored phase conductor, and (3) the phase-to-phase voltage that is in quadrature with the phase-to-ground voltage of the monitored phase. A predetermined phase angle relationship between these three phasor signals for a phase conductor identifies that conductor as the one experiencing a fault to ground. The predetermined phase angle relationship is these three phasor signals within 60 electrical degrees of each other. For a 60° relationship, the time of coincidence is at least 5.55 ms for a 60 Hz system. It has been determined that this prior art approach using three phasor signals cannot properly detect close-in faults having a high resistance to ground. Thus, the instant invention improves upon the prior art technique by disclosing means to protect against high resistance close-in faults.

SUMMARY OF THE INVENTION

A protective relay apparatus and method for determining the faulted phase conductor of an ac electrical power transmission line is disclosed. The protective relay apparatus and method is capable of detecting high resistance close-in ground faults. The status of each phase conductor is monitored by evaluating the following three phasor signals: (1) the zero sequence current, (2) the negative sequence component of the voltage on each phase conductor rotated by the factor $+j$, and (3) the quadrature phase voltage for each phase conductor advanced (i.e., counterclockwise) by 30 electrical degrees. These three phasor quantities are compared for each phase conductor and if a predetermined phase angle relationship exists between them for any of the phase conductors, that conductor is identified as the only one experiencing a fault to ground. The predetermined phase angle relationship is satisfied when these three phasor quantities are within 60 electrical degrees of each other; the time of coincidence is therefore at least 5.55 ms for a 60 Hz system.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

The problem with the prior art relay disclosed and claimed in U.S. patent application Ser. No. 321,158 (filed Nov. 13, 1981) can be illustrated as follows. For a single-phase-to-ground fault, it is known that:

$$I_1 = I_2 = I_0 = \frac{jV}{3R_f + j(X_1 + X_2 + X_0)}, \text{ where } R_f =$$

fault resistance $$= \frac{V}{X} \angle 0° \text{ for } R_f = 0, \text{ where } X = X_1 + X_2 + X_0$$

$$= \frac{V}{Z} \angle \theta° \text{ for } R_f \neq 0, \text{ where } Z = 3R_f + jX$$

$$\text{and } \theta = \tan^{-1}\left(\frac{3R_f}{X}\right)$$

Figure 1A:
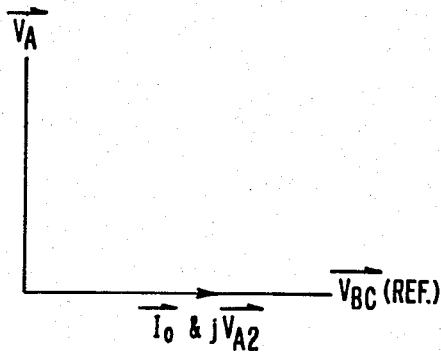
FIGS. 1A and 1B are phasor diagrams illustrating the problems of the prior art technique for close-in, high-resistance faults.
Figure 1B:
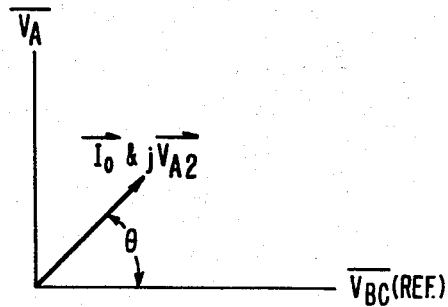

FIGS. 1A and 1B illustrate the phasor relationship of $I_O$, $jV_{A2}$, and $V_{BC}$ (the quadrature phase voltage for the phase A conductor, i.e., the phase-to-phase voltage that is in quadrature with the phase to ground voltage for the phase A conductor). In FIG. 1A, it is assumed that the fault resistance is zero, and therefore the prior art protective relay properly responds to the condition of FIG. 1A, because the three phasor signals are within 60 electrical degrees of each other. (Note, as disclosed in the aforementioned patent application the phasor $jV_{A2}$ can be replaced by the phasor $I_{A2}$.)

In FIG. 1B, it is assumed that the fault resistance is much greater than zero. Since the angle $\theta$ is determined by the fault resistance, $\theta$ can be greater than 60°, and the prior art protective relay does not respond to this condition. That is, the three phasor signals are separated by more than 60 electrical degrees and therefore the prior art protective relay cannot identify the phase conductor that is faulted to ground. The effect of a non-zero fault resistance is more pronounced when the ground fault is close to the protective relay or when this technique is used on short transmission lines.

Figure 2A:
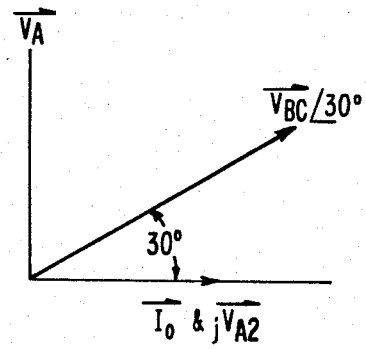
FIGS. 2A and 2B are phasor diagrams illustrating the improvements realized with the present invention.
Figure 2B:
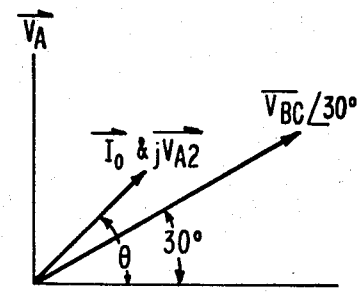

The novel technique of the present invention involves advancing the quadrature phase voltage for each phase conductor by 30 electrical degrees; as shown in FIGS. 2A and 2B, this feature improves the phase selector relay as disclosed in the prior patent application. FIG. 2A illustrates the three phasors, with the quadrature phase voltage advanced by 30°, for the case of zero fault resistance. As can be seen, the three phasors are within 60 electrical degrees of each other and therefore the protective relay properly identifies the faulted phase conductor. FIG. 2B illustrates the three phasors for the non-zero fault resistance. The angle $\theta$ approaches 90° as the fault resistance approaches infinity. Therefore, the three phasors are coincident within 60 electrical degrees. For very large values of fault resistance, and so long as the fault resistance is not infinite, the angle $\theta$ is less than 90°. Now the phasors are within 60 electrical degrees of each other and the relay operates. Further details of the prior art protective relay and its theoretical basis are disclosed in the above-identified patent application, which is hereby incorporated by reference.

Figure 3:
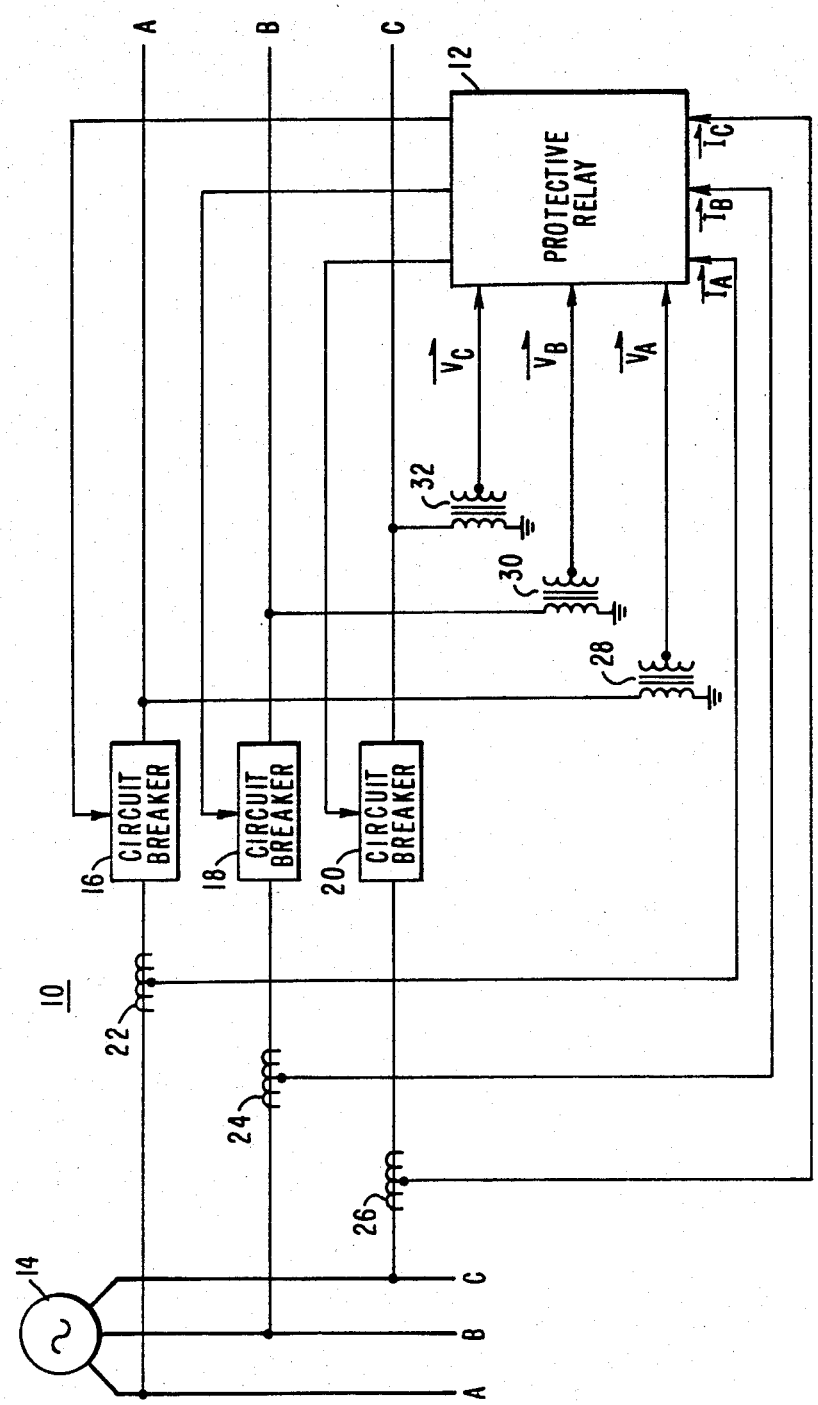
FIG. 3 is a partial block and partial schematic diagram of a three phase electrical power transmission network including a protective relay constructed according to the teachings of the present invention.

In FIG. 3, there is shown a partial block and partial schematic diagram of a three-phase ac electrical power transmission network 10 employing a protective relay 12 constructed according to the teachings of the present invention. Specifically, the three-phase ac electrical power transmission network 10 includes an ac source 14 for producing an ac electrical power signal having a frequency of 50 Hz or 60 Hz. The ac source 14 is connected to a phase A conductor of the three-phase ac electrical power transmission network 10 via a circuit breaker 16, to a phase B conductor via a circuit breaker 18, and to a phase C conductor via a circuit breaker 20.

A current transformer 22 produces a signal $I_A$ that is representative of the current on the phase A conductor. A current transformer 24 produces a signal $I_B$ that is representative of the current on the phase B conductor. A current transformer 26 produces a signal $I_C$ that is representative of the current on the phase C conductor. The protective relay 12 is responsive to the signals $I_A$, $I_B$, and $I_C$. A voltage transformer 28 is connected to the phase A conductor for producing a signal $V_A$; a voltage transformer 30 is connected to the phase B conductor for producing a signal $V_B$; and a voltage transformer 32 is connected to the phase C conductor for producing a signal $V_C$. The protective relay is also responsive to the signals $V_A$, $V_B$, and $V_C$. The protective relay 12 analyzes the six signals input thereto for controlling the circuit breakers 16, 18, and 20. A first output terminal of the protective relay 12 is connected to a control input terminal of the circuit breaker 16; a second output terminal of the protective relay 12 is connected to a control input terminal of the circuit breaker 18; a third output terminal of the protective relay 12 is connected to a control input terminal of the circuit breaker 20.

Figure 4:
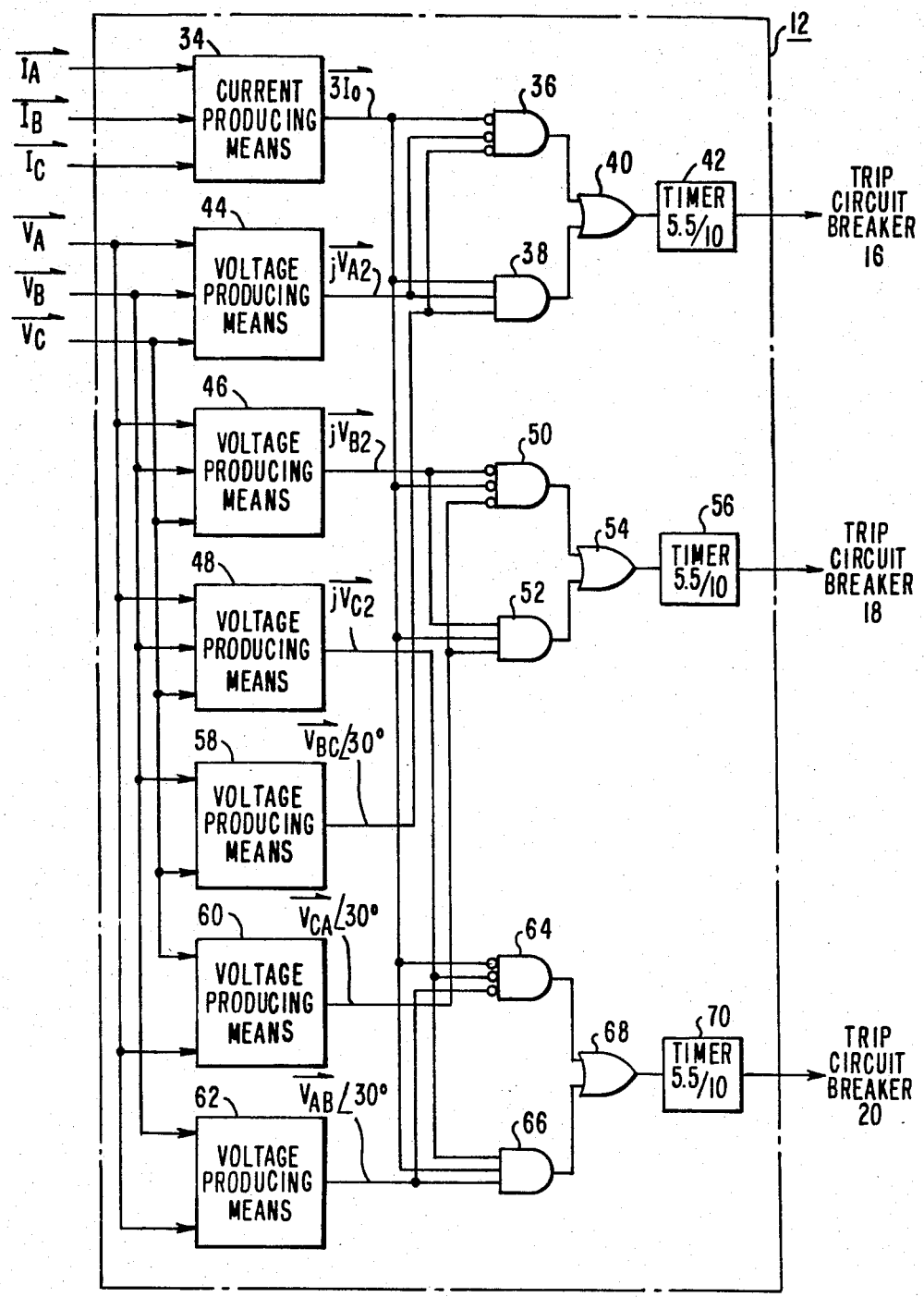
FIG. 4 is a block diagram of the protective relay of FIG. 3.

Turning to FIG. 4, there is shown in partial block and partial schematic form, details of the protective relay 12 in accord with the theoretical considerations discussed above. The currents $I_A$, $I_B$ and $I_C$, are input to a means 34 for producing the zero sequence current, designated $3I_O$ in FIG. 4. The means 34 can be implemented as shown in FIG. 3 of the aforementioned incorporated patent application. Alternatively, the zero sequence current $3I_O$ can be obtained directly from the power system. Also in FIG. 4, the signals $V_A$, $V_B$, and $V_C$ are input to means 44, 46, and 48. The means 44 produces a signal designated $jV_{A2}$, which is the negative sequence component on the phase A conductor rotated 90 electrical degrees counterclockwise (+j). Similarly, the means 46 and 48 produce, respectively, signals representing the negative sequence component on the phase B conductor rotated by 90 electrical degrees counterclockwise ($jV_{B2}$) and the negative sequence component on the phase C conductor rotated counterclockwise 90 electrical degrees ($jV_{C2}$). The means 44, 46, and 48 can be implemented by the circuit shown in FIG. 4 of the incorporated patent application.

Figure 5:
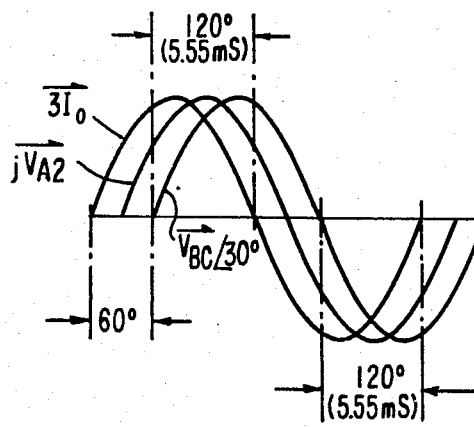
FIG. 5 is a timing diagram illustrating the phase relationship of the signals monitored by the protective relay of FIG. 4 for a single-phase-to-ground fault.

The signals $V_B$ and $V_C$ are input to a means 58 for producing a quadrature phase voltage signal shifted by 30 electrical degrees counterclockwise, for the phase A conductor. (A quadrature phase voltage for a given phase conductor is the phase-to-phase voltage that is in quadrature with the phase-to-ground voltage for that phase conductor.) This shifted quadrature phase voltage signal, is designated $V_{BC} \angle 30°$ in FIG. 4. A means 60 is responsive to the signals $V_A$ and $V_C$ for producing a shifted quadrature phase voltage signal for the phase B conductor; this shifted quadrature phase voltage signal is designated $V_{CA} \angle 30°$ in FIG. 4. The signals $V_A$ and $V_B$ are input to a means 62 for producing a shifted quadrature phase voltage signal $V_{AB}$ 110 30°. Each of the signals produced by the means 58, 60, and 62, represent the quadrature phase voltages for the phase conductors A, B, and C, respectively, shifted 30 electrical degrees counterclockwise. The means 58, 60, and 62 can be implemented as shown in FIG. 5 of the incorporated patent application, with the addition of a phase shifting device to shift the signals 30 electrical degrees counterclockwise. Such phase shifting devices are well known in the art.

Continuing with FIG. 4, the negative sequence signal, $3I_O$ is input to a first inverting input terminal of an AND gate 36 and to a first non-inverting input terminal of an AND gate 38. The signal $jV_{A2}$ is input to a second inverting input terminal of the AND gate 36, and to a second non-inverting input terminal of the AND gate 38. The signal $V_{BC} \angle 30°$ is input to a third inverting input terminal of the AND gate 36 and to a third non-inverting input terminal of the AND gate 38. An output terminal of the AND gate 36 is connected to a first input terminal of an OR gate 40; and an output terminal of the AND gate 38 is connected to a second input terminal of the OR gate 40. A timer 42 is responsive to a signal from the OR gate 40 for producing a signal to trip the circuit breaker 16. The timer 42 has a pick-up time of 5.5 ms and a drop-out time of 10 ms. The AND gates 36 and 38, the OR gate 40, and the timer 42, in effect, form a monitor for determining the existence of a single-phase-to-ground fault on the phase A conductor.

In a manner similar to that disclosed in the incorporated patent application, the AND gate 36 monitors the negative half cycles and the AND gate 38 monitors the positive half cycles of the signals $3I_O$, $jV_{A2}$, and $V_{BC} \angle 30°$. Monitoring of both the positive and negative half cycles yields the fastest possible fault detection. As discussed hereinbefore, a single-phase-to-ground fault on a three-phase electrical power system causes the monitored phasors to be within 60 electrical degrees of each other for the faulted phase conductor. The monitored phasor signals are not within 60 electrical degrees of each other for the non-faulted phase conductors. Further, for a phase-to-phase-to-ground fault, the monitored phasor signals are not within 60 electrical degrees of each other for any of the phase conductors.

As shown in FIG. 5, if the three monitored phasor signals $3I_O$, $jV_{A2}$, and $V_{BC} \angle 30°$ are within 60 degrees of each other, the time of coincidence (as determined by the AND gate 38) is at least 5.55 ms for a 60 Hz system. The time of negative coincidence, as determined by the AND gate 36, is also 5.55 ms. If the phase angles are closer than 60°, the coincidence time increases, and if the phase angle spread exceeds 60°, the coincidence time decreases. The purpose of the timer 42 is to determine when the coincidence of the three monitored phasor signals exceeds 60°. If the signal input to the timer 42 persists for less than 5.55 ms, the timer 42 does not produce an output signal. This indicates that the three monitored phasor signals differ by more than 60 electrical degrees and therefore, a single-phase-to-ground fault has not occurred. If the signal input to the timer 42 persists for more than 5.55 ms, indicating the three monitored phasor signals are within 60 electrical degrees, the output signal from the timer 42 is stretched for 10 ms to provide a continuous output signal to trip the circuit breaker 16, until the required coincidence is detected during the negative half cycle.

Monitoring of the phase B conductor is performed by AND gates 50 and 52, an OR gate 54, and a timer 56. A first inverting input terminal of the AND gate 50 and a first non-inverting input terminal of the AND gate 52 are responsive to the signal $jV_{B2}$. A second inverting input terminal of the AND gate 50 and a second non-inverting input terminal of the AND gate 52 are responsive to the signal $3I_O$. A third inverting input terminal of the AND gate 50 and a third non-inverting input terminal of the AND gate 52 are responsive to the signal $V_{CA} \angle 30°$. The AND gate 50 monitors the negative half-cycle of the three signals input thereto, and the AND gate 52 performs a similar evaluation for the positive half-cycles. An output terminal of the AND gate 50 is connected to a first input terminal of the OR gate 54, and a second input terminal thereof is connected to an output terminal of the AND gate 52. The OR gate 54 produces an output signal whenever there is coincidence between the three signals evaluated by the AND gate 50 or by the AND gate 52. The timer 56 produces an output signal to trip the circuit breaker 18 when the OR gate 54 produces a signal for more than 5.55 ms. This condition indicates that the three phasor signals $3I_O$, $jV_{B2}$, and $V_{CA} \angle 30°$ are within 60°. The signal from the timer 56 is stretched by 10 ms to provide a continuous output signal until coincidence during the negative half-cycle is detected.

The phase C conductor is monitored by AND gates 64 and 66, an OR gate 68, and a timer 70. The first inverting input terminal of the AND gate 64 is responsive to the signal $3I_O$ and a first non-inverting input terminal of the AND gate 66 is also responsive thereto. A second inverting input terminal of the AND gate 64 and a second non-inverting input terminal of the AND gate 66 are responsive to the signal $jV_{C2}$. A third inverting input terminal of the AND gate 64 and a third non-inverting input terminal of the AND gate 66 are responsive to the signal $V_{AB} \angle 30°$. The AND gates 64 and 66 produce an output signal when there is a coincidence between the three signals input to either of the AND gates 64 or 66. The AND gate 64 monitors the negative half cycles and the AND gate 66 monitors the positive half-cycles. A first input terminal of the OR gate 68 is connected to an output terminal of the AND gate 64. A second input terminal of the OR gate 68 is connected to an output terminal of the AND gate 66. The OR gate 68 produces an output signal state when either of the AND gates 64 or 66 indicate a coincidence among the signals evaluated thereby. If the signal from the OR gate 68 persists for more than 5.55 ms, the timer 70 produces a signal to trip the circuit breaker 20. The signal from the timer 70 is stretched by 10 ms to provide a continuous output signal until coincidence during the negative half-cycle is detected. Thus, the circuit breaker 20, located on the phase C conductor, is tripped when there is a single-phase-to-ground fault on the phase C conductor as determined by the coincidence of the signals $3I_O$, $jV_{C2}$, and $V_{AB} \angle 30°$.

For a three-phase system $-V_C$ is in phase with $V_{BC} \angle 30°$, $-V_A$ is in phase with $V_{CA} \angle 30°$, and $-V_B$ is in phase with $V_{AB} \angle 30°$. Therefore, in another embodiment of the present invention the quantities $-V_C$, $-V_A$, and $-V_B$ are used in lieu of $V_{BC} \angle 30°$, $V_{CA} \angle 30°$, and $V_{AB} \angle 30°$ to identify the faulted phase conductor.

The present invention also includes a method for detecting the existence of a single-phase-to-ground fault on a phase conductor of a three-phase electrical power transmission network. The method includes producing signals representative of the zero sequence current of the electrical power system, the negative sequence voltage component on the phase A conductor rotated 90° counterclockwise (or the negative sequence current on the phase A conductor), the negative sequence voltage component on the phase B conductor rotated 90° counterclockwise (or the negative sequence current on the phase B conductor), the negative sequence voltage component on the phase C conductor rotated 90° counterclockwise (or the negative sequence current on the phase C conductor), the quadrature phase voltage on the phase A conductor rotated 30° counterclockwise, the quadrature phase voltage on the phase B conductor rotated 30° counterclockwise, and the quadrature phase voltage on the phase C conductor rotated 30° counterclockwise. The zero sequence signal and the two signals associated with the phase A conductor are monitored to determine whether these three signals are within 60 electrical degrees. The existence of such coincidence indicates a single-phase-to-ground fault on the phase A conductor and therefore, the circuit breaker associated with the phase A conductor is tripped. A coincidence among the two signals associated with the phase B conductor and the zero sequence signal indicate a single-phase-to-ground fault on the phase B conductor. Coincidence among the zero sequence signal and the two signals associated with the phase C conductor indicates a single-phase-to-ground fault on the phase C conductor.

What is claimed is:

1. Protective relay apparatus for detecting a single-phase-to-ground fault in a three-phase electrical power system and for identifying the faulted phase conductor, said protective relay apparatus comprising:

means for providing a first phasor signal representative of unbalanced current in the three-phase electrical power system, means for providing a second phasor signal for each phase conductor representative of a negative sequence component of an electrical quantity for each phase conductor;

means for providing a third phasor signal for each phase conductor representative of a quadrature voltage for each phase conductor advanced by a predetermined number of electrical degrees;

coincidence means for determining the coincidence of said first, second, and third phasor signals for each phase conductor;

said coincidence means providing a signal indicating the occurrence of a single-phase-to-ground fault on an identified phase conductor when the phase angles of said first, second, and third phasor signals for the identified phase conductor have a predetermined relationship.

2. The protective relay apparatus of claim 1 wherein the negative sequence component is the negative sequence current.

3. The protective relay apparatus of claim 1 wherein the negative sequence component is the negative sequence voltage rotated by 90° counterclockwise.

4. The protective relay apparatus of claim 1 wherein the quadrature voltage is the line-to-line voltage having a phase angle normal to the phase angle of the phase conductor being monitored.

5. The protective relay apparatus of claim 1 wherein the predetermined number of electrical degrees for each quadrature voltage is 30 electrical degrees counterclockwise.

6. The protective relay apparatus of claim 1 wherein the predetermined relationship of the phase angles is the phase angles all being within a predetermined number of electrical degrees of one another.

7. The protective relay apparatus of claim 4 wherein the predetermined number of electrical degrees is 60 electrical degrees.

8. Protective relay apparatus for detecting a single-phase-to-ground fault in a three-phase electrical power system having phase conductors A, B, and C, phase voltages $V_A$, $V_B$, and $V_C$, and phase currents $I_A$, $I_B$, and $I_C$, said protective relay apparatus comprising:

means providing a first phasor signal representative of the sum of the phase currents $I_A$, $I_B$, and $I_C$;

means providing second, third, and fourth phasor signals representative of a negative sequence component referenced to the phase conductors A, B, and C, respectively;

means providing fifth, sixth, and seventh phasor signals representative of $-V_C$, $-V_A$, and $-V_B$, respectively;

first detector means for providing a signal indicating a single-phase-to-ground fault on the phase A conductor when said first, second, and fifth phasor signals are within a predetermined number of electrical degrees of one another;

second detector means for providing a signal indicating a single-phase-to-ground fault on the phase B conductor when said first, third, and sixth phasor signals are within a predetermined number of electrical degrees of one another;

third detector means for providing a signal indicating a single-phase-to-ground fault on the phase C conductor when said first, fourth, and seventh phasor signals are within a predetermined number of electrical degrees of one another.

9. A method for detecting a single-phase-to-ground fault in a three-phase electrical power system and for identifying the faulted phase conductor, said protective relay apparatus comprising:

providing a first phasor signal representative of an unbalanced current in the three-phase electrical power system, providing a second phasor signal for each phase conductor, wherein said second phasor signal represents a negative sequence component of an electrical quantity for each phase conductor;

providing a third phasor signal for each phase conductor, wherein said third phasor signal represents a quadrature voltage for each phase conductor, advanced by a predetermined number of electrical degrees;

comparing the phase angles of said first, second, and third phasor signals for each phase conductor; for providing a signal indicating the occurrence of a single-phase-to-ground fault and identifying the faulted phase conductor, wherein the fault is on the phase conductor for which the phase angles of said first, second, and third phasor signals have a predetermined relationship.

10. The method of claim 9 wherein the negative sequence component is the negative sequence current.

11. The method of claim 9 wherein the negative sequence component is the negative sequence voltage rotated by 90° counterclockwise.

* * * * *